(12) United States Patent
Jurek et al.

(10) Patent No.: US 8,299,377 B2
(45) Date of Patent: Oct. 30, 2012

(54) INTERLOCKS FOR WITHDRAWABLE BREAKERS

(75) Inventors: Tomasz Ludwik Jurek, Pewel Mala (PL); Przemyslaw Eugeniusz Cieply, Bielsko-Biala (PL); Przemyslaw Marcin Dabrowski, Meszna (PL); Marcin Piotr Lagiewka, Bielsko-Biala (PL); Jacek Stanislaw Mrowiec, Bielsko-Biala (PL); Tomasz Pawel Tomanek, Bielsko-Biala (PL)

(73) Assignee: General Electric Company, Schenectady, NY (US)

( * ) Notice: Subject to any disclaimer, the term of this patent is extended or adjusted under 35 U.S.C. 154(b) by 109 days.

(21) Appl. No.: 13/017,348

(22) Filed: Jan. 31, 2011

(65) Prior Publication Data

US 2012/0193194 A1 Aug. 2, 2012

(51) Int. Cl.
*H01H 9/20* (2006.01)

(52) U.S. Cl. .................................... 200/50.21; 361/608

(58) Field of Classification Search .... 200/50.21–50.26; 361/605–610, 615
See application file for complete search history.

(56) References Cited

U.S. PATENT DOCUMENTS

| | | | | |
|---|---|---|---|---|
| 4,041,260 | A * | 8/1977 | Swindler et al. | 200/50.02 |
| 4,686,334 | A | 8/1987 | Nebon et al. | |
| 5,200,585 | A * | 4/1993 | Davies et al. | 200/50.22 |
| 5,337,210 | A * | 8/1994 | Ishikawa et al. | 361/608 |
| 5,691,518 | A * | 11/1997 | Jones et al. | 200/50.21 |
| 6,545,234 | B1 * | 4/2003 | Trivette et al. | 200/50.21 |
| 6,900,400 | B2 * | 5/2005 | Rohlfing | 200/50.31 |
| 7,022,923 | B2 | 4/2006 | Liebetruth | |
| 7,053,321 | B2 * | 5/2006 | Leccia et al. | 200/50.1 |
| 7,067,746 | B2 | 6/2006 | Deylitz | |
| 7,903,393 | B2 | 3/2011 | Buxton et al. | |

* cited by examiner

*Primary Examiner* — Gary F. Paumen
(74) *Attorney, Agent, or Firm* — Cantor Colburn LLP

(57) ABSTRACT

A circuit breaker interlock apparatus can include a circuit breaker, a first moveable arm that is moveable when the circuit breaker is open, a second moveable arm pivotally coupled to the first moveable arm that is movable when the first moveable arm is moveable and a blocking arm, configured to interlock with the second movable arm.

20 Claims, 3 Drawing Sheets

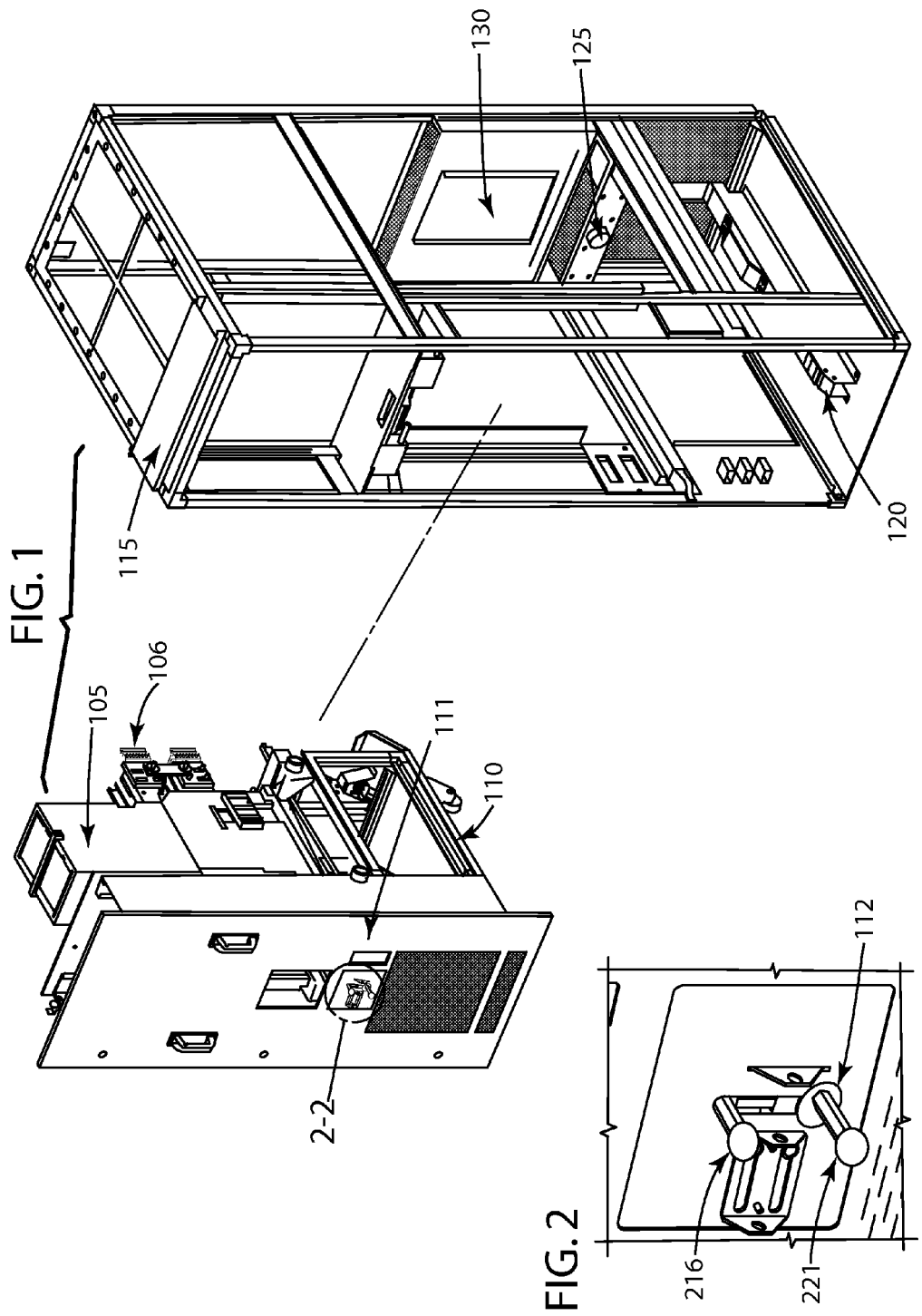

INTERLOCKS FOR WITHDRAWABLE BREAKERS

BACKGROUND OF THE INVENTION

The subject matter disclosed herein relates to circuit breakers, and more particularly to interlock apparatuses and assemblies for withdrawable circuit breakers.

Current circuit breakers can be mounted on a trolley that can be inserted into and withdrawn from modules. There are standards that include certain requirements for interlocks on withdrawable circuit breakers. Currently, interlocks can be engaged or dis-engaged even though there is no indication that the circuit breaker has opened.

What is needed is an interlock assembly that prevents the breaker from being closed or opened in undesired position of a breaker on a trolley in the module.

BRIEF DESCRIPTION OF THE INVENTION

According to one aspect of the invention, a circuit breaker interlock apparatus is described. The circuit breaker interlock apparatus can include a circuit breaker, a first moveable arm that is moveable when the circuit breaker is open, a second moveable arm pivotally coupled to the first moveable arm that is movable when the first moveable arm is moveable and a blocking arm, configured to interlock with the second movable arm.

According to another aspect of the invention, a circuit breaker system is described. The circuit breaker system can include a module, a trolley configured for insertion into the module, a circuit breaker disposed on the trolley, a first moveable arm coupled to the trolley, and configured to activate a breaker force trip unit in response to movement of the first moveable arm, a second moveable arm pivotally coupled to the first moveable arm and the trolley, a blocking arm pivotally coupled to trolley and the first movable arm and a threaded rod configured to couple to the module, wherein the blocking arm is configured to interlock with the second moveable arm.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 illustrates a circuit breaker mounted on a breaker trolley, and a module into which the breaker trolley can be inserted.

FIG. 2 illustrates a close-up of an opening disposed on the trolley of

FIG. 1.

Figure 4:
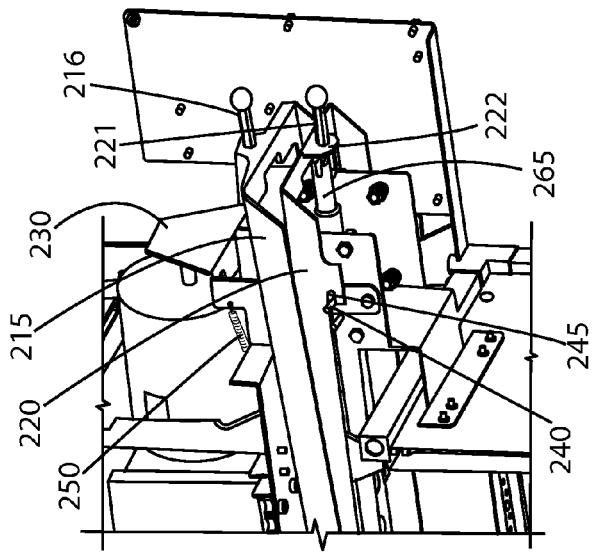
FIG. 4 illustrates a bottom perspective view of a portion of the circuit breaker and the trolley detailing features of FIG. 3.

The detailed description explains embodiments of the invention, together with advantages and features, by way of example with reference to the drawings.

DETAILED DESCRIPTION OF THE INVENTION

Exemplary embodiments include withdrawable breaker apparatuses and assemblies that include interlocks that are activated or deactivated by the breaker main drive plunger.

FIG. 1 illustrates a circuit breaker 105 mounted on a breaker trolley 110, and a module 115 into which the breaker trolley 110 can be inserted. FIG. 2 illustrates an opening 112 disposed on the trolley 110. As known in the art, the breaker 105 can include clusters 106. As described further herein, the exemplary interlocks implement the breaker main drive plunger when the breaker 105 is inserted in the module, to indicate whether or not the breaker 105 is open. As further described herein, the module 115 includes a support 120 to which the trolley 110 interlocks. The module 115 further includes a threaded aperture 125 configured to receive a threaded rod, and shutters 130 that open and close giving or not giving access to module terminals that are configured to receive the clusters 106. The trolley 110 can include a front panel 111 with an opening 112 described further herein.

Figure 3:
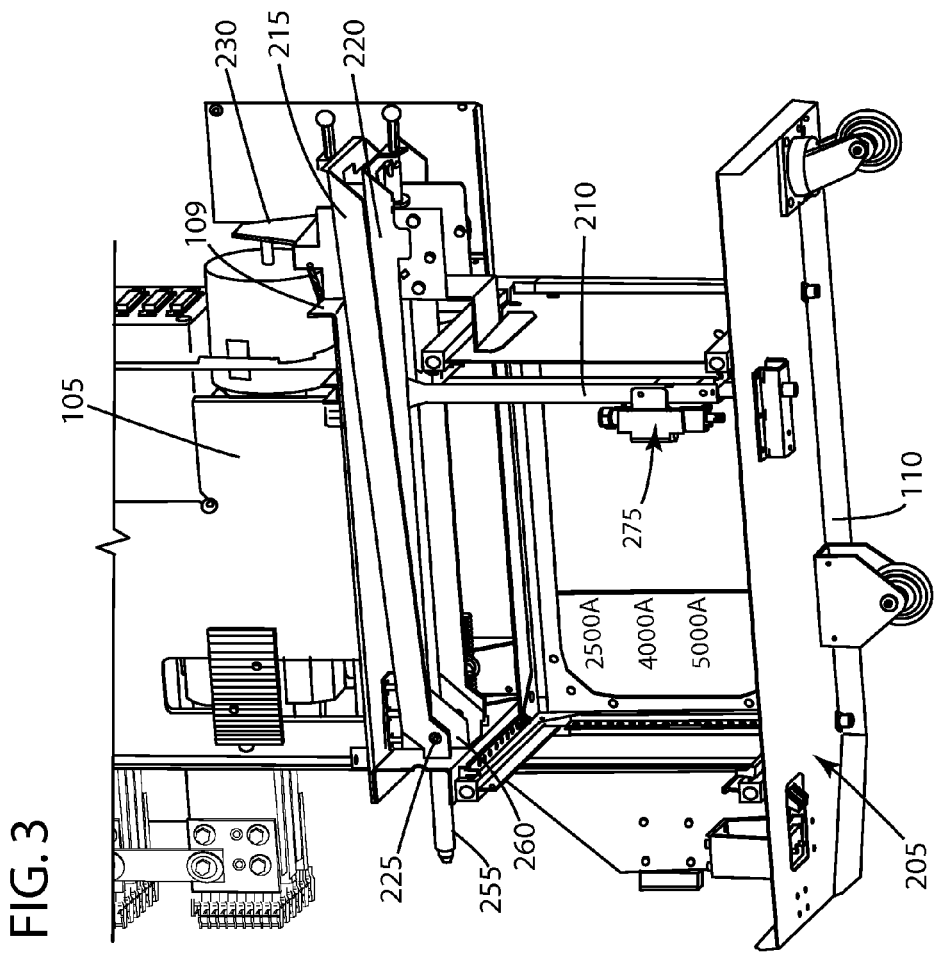
FIG. 3 illustrates a bottom perspective view of the breaker on the trolley 110 of FIG. 1.
Figure 6:
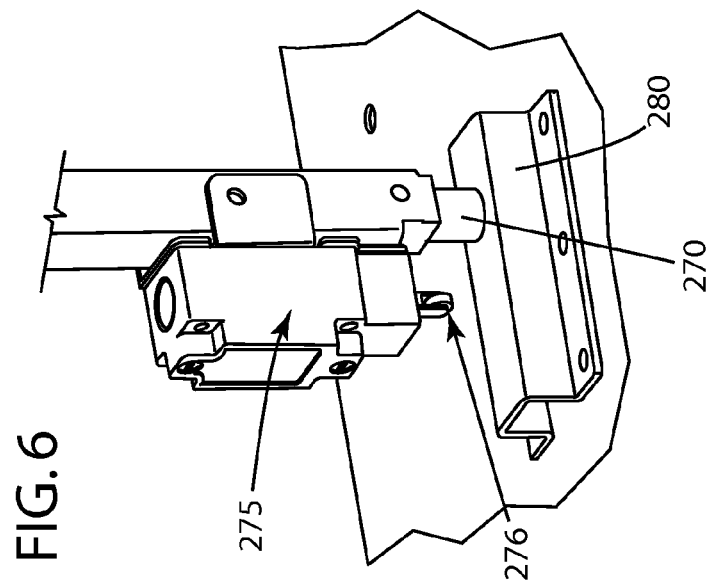
FIG. 6 illustrates a close-up side view of a limit switch.
Figure 5:
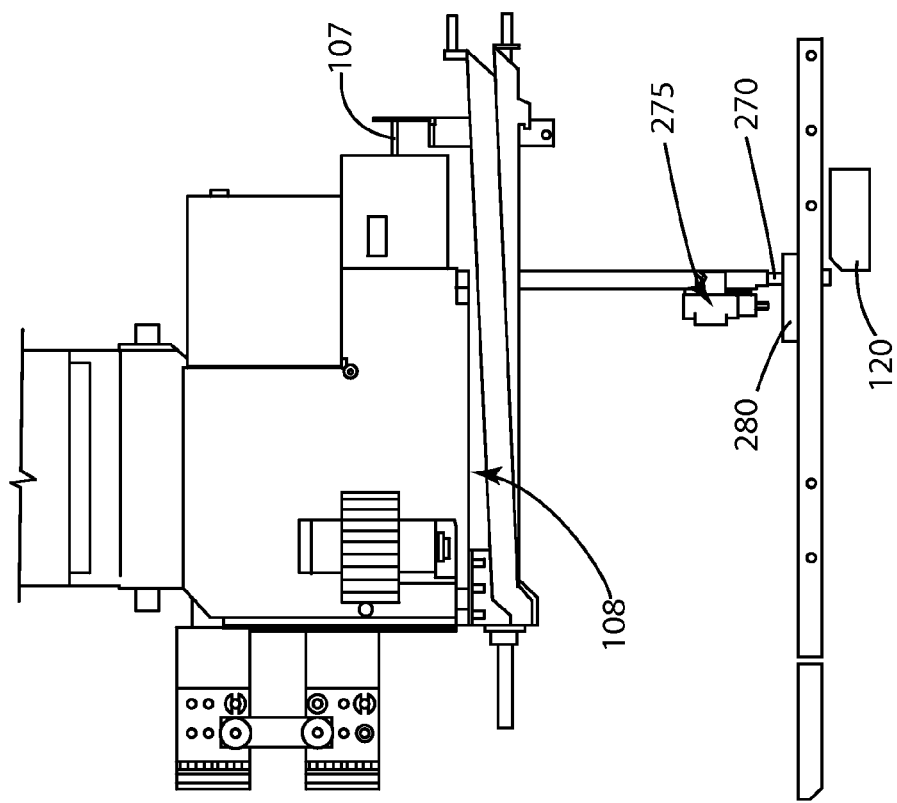
FIG. 5 illustrates a side view of the circuit breaker and trolley of FIGS. 3 and 4.

FIG. 3 illustrates a bottom perspective view of the breaker 105 on the trolley 110. FIG. 4 illustrates a bottom perspective view of a portion of the circuit breaker 105 and the trolley 110 detailing features of FIG. 2. FIG. 5 illustrates a side view of the circuit breaker 105 and trolley of FIGS. 2 and 3. FIG. 6 illustrates a close-up side view of a limit switch 275. In exemplary embodiments, the interlock assemblies are integrated into the trolley 110 and include several parts as now described. The trolley 115 can include a base plate 205. A vertical channel bar 210 goes through the cutout in the base 205 as further described herein. The vertical channel bar 210 is further coupled to a first moveable arm 215. The breaker 105 is mounted to the mounting plate 109. The first moveable arm 215 includes a handle 216. The vertical channel bar 210 can include a trolley lock 270 that couples with the support 120 when the trolley 110 is inserted into the module 115, as described further herein. The vertical channel bar 210 can also include a limit switch 275 as further described herein. The limit switch 275 is mounted to the vertical channel bar 210 adjacent the trolley lock 270 and the support 120. A button 276 on the limit switch 275 is configured to engage with a table plate 280 on the base plate 205. A second moveable arm 220 is pivotally coupled to the first moveable arm 215 via a common pivot point 225. The second moveable arm 220 includes a handle 221 and cover plate 222 on to which the handle 221 can be mounted. A blocking arm 230 is pivotally coupled with respect to the first and second movable arms 215, 220. The blocking arm 230 includes interlock pins 240 that are configured to interlock with interlocking slots 245 that are disposed on the second moveable arm 220. The interlock pins 240 are configured to block the second moveable arm 220 by sliding into the interlocking slots 245. The blocking arm 230 further includes a resilient member 250 (e.g., springs) that are coupled to the breaker mounting plate 109, thus spring loading the blocking arm 230. A threaded rod (e.g., power screw) 255 is coupled to the trolley 110 via one or more brackets 260. The threaded rod 255 has a crank-receiving end 265 that can be concealed by the cover plate 222 as further described herein.

As described herein, the module 115 is configured to receive the trolley 110 and the breaker 105. When the trolley 110 and the breaker 105 are inserted into the module 115, an interlock operation is carried out as now described. A user can maneuver the trolley 110 into the module 115. Once placed into the module 115, threaded rod 255 aligns with the threaded aperture 125. The user can rotate the threaded rod 255 so it threads with the threaded aperture (i.e., like a nut and bolt arrangement). To rotate the threaded rod 255, the user can implement a crank that engaged the crank-receiving end 265. By rotating the threaded rod 255, an internal mechanism (not shown) also opens the shutters 130, which allows the clusters 106 to enter the opened shutters 130, thereby engaging the breaker 105 with the suitable terminals in the module. In order to engage the crank-receiving end 265, the cover plate 222 is lifted to reveal the crank receiving end (which can be accomplished through the opening 112 in the front door 111 of the trolley 110. As such, the opening 112 is initially covered by the cover plate 222 of the second moveable arm 220, which is lifted to insert the crank to couple it with the crank-receiving end 265. When the breaker 105 is installed on the trolley 110 is open, the user can lift up the second moveable arm 220 via the handle 221. The second moveable arm 220 rotates about the pivot 225, which reveals the crank-receiving end 265 as described herein.

The breaker 105 can include a plunger 107, which is fully retracted when the breaker 105 is opened and is fully extended when the breaker 105 is closed. The breaker can also include a force trip unit 108, which trips the breaker 105 when it is pushed mechanically. By lifting the second moveable arm 220 via the handle 221, the limit switch 275 is deactivated. When the second moveable arm 220 is in a resting unengaged position, the button 276 on the limit switch 275 is pressed against the table plate 280. When the second moveable arm 220 is lifted as described herein, the button 276 extends. An electrical signal controlled by limit switch 275 is used to prevent breaker 105 from being closed. When the breaker 105 is closed the plunger 107 extends and rotates the blocking arm 230, which locks the second moveable arm in a close and spring-loaded position. In this spring-loaded position, the cover plate 222 conceals the crank-receiving end 265, thereby preventing a crank from engaging the crank-receiving end 265 to drive the threaded rod 255.

In order to unlock the second moveable arm, the first moveable arm 215 is lifted to open the breaker 105 by forcing activation of the force trip unit 108. When the trolley 110 is in an intermediate position and the user ceases a rack-in or rack-out operation, then removes the crank from the threaded rod 255, the breaker 105 cannot be closed because the first moveable arm 215 remains in a lifted position by the trolley lock 270 being lifted by the support 120. In this way, the lifted first moveable arm 215 keeps the limit switch 275 deactivated, disabling closing of the breaker 105.

As such, the second movable arm, 220 and the blocking arm 230 are configured to interlock with one another. The blocking arm 230 is spring loaded and is configured to place the second movable arm 220 into and out of the interlocked configuration. The breaker plunger 107, when fully extended keeps the locking arm 230 spring loaded, thus maintaining the second moveable arm in the interlocked configuration. When a user lifts the first moveable arm 215, the force trip unit 108 trips the breaker 105. The plunger 107 recesses, thereby causing the resilient members 250 to pivot the blocking arm 230, which disengages the interlocking pins 240 from the interlocking slots 245. The user is now free to lift the second movable arm 220 to access the crank-receiving end 265. In this way, the user can access the threaded rod 255 only when the breaker is open.

A technical advantage of the embodiments described herein is that the exemplary interlock assemblies generate a feedback loop that allows moving the breaker 105 into and out of the trolley 110 only if the breaker 105 is in the open position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A circuit breaker interlock apparatus, comprising:
   a circuit breaker;
   a first moveable arm that is moveable when the circuit breaker is open;
   a second moveable arm pivotally coupled to the first moveable arm that is movable when the first moveable arm is moveable; and
   a blocking arm, configured to interlock with the second movable arm.

2. The apparatus as claimed in claim 1 further comprising a vertical channel bar coupled to the first movable arm.

3. The apparatus as claimed in claim 2 further comprising a limit switch coupled to the vertical channel bar.

4. The apparatus as claimed in claim 3 wherein the circuit breaker includes a plunger configured to rotate the blocking arm when the circuit breaker is closed and the plunger is in a fully extended position.

5. The apparatus as claimed in claim 4 wherein the limit switch generates a signal that prevents closing of the breaker.

6. The apparatus as claimed in claim 1 further comprising interlocking pins disposed on the blocking arm.

7. The apparatus as claimed in claim 6 further comprising interlocking slots disposed on the second movable arm.

8. The apparatus as claimed in claim 7 wherein the interlocking pins and the interlocking slots are configured to interlock, thereby interlocking the second movable arm to the blocking arm.

9. The apparatus as claimed in claim 1 further comprising a breaker mounting plate coupled to the circuit breaker, wherein the blocking arm is spring loaded with respect to breaker mounting plate.

10. The apparatus as claimed in claim 9 wherein blocking arm is configured to place the second movable arm into and out of an interlocked configuration.

11. A circuit breaker system, comprising:
    a module;
    a trolley configured for insertion into the module;
      a circuit breaker disposed on the trolley;
      a first moveable arm coupled to the trolley, and configured to activate a breaker force trip unit in response to movement of the first moveable arm;
      a second moveable arm pivotally coupled to the first moveable arm and the trolley;
    a blocking arm pivotally coupled to trolley; and
    a threaded rod configured to couple to the module,
    wherein the blocking arm is configured to interlock with the second moveable arm.

12. The system as claimed in claim 11 further comprising a vertical channel bar coupled to the first movable arm.

13. The system as claimed in claim 12 further comprising a limit switch coupled to the vertical channel bar.

14. The system as claimed in claim 13 wherein the circuit breaker includes a plunger configured to pivot the blocking arm when the plunger is in a fully extended position.

15. The system as claimed in claim 14 wherein the limit switch generates a signal that prevents closing of the circuit breaker.

16. The system as claimed in claim 11 further comprising interlocking pins disposed on the blocking arm.

17. The system as claimed in claim 16 further comprising interlocking slots disposed on the second movable arm.

18. The system as claimed in claim 17 wherein the interlocking pins and the interlocking slots are configured to interlock, thereby interlocking the first movable arm to the second movable arm.

19. The system as claimed in claim 11 wherein the blocking arm is spring loaded with respect to the trolley.

20. The system as claimed in claim 19 wherein blocking arm is configured to place the second movable arm into and out of an interlocked configuration.

* * * * *